(12) United States Patent
Xiao et al.

(10) Patent No.: US 8,835,056 B2
(45) Date of Patent: Sep. 16, 2014

(54) LITHIUM ION SECONDARY BATTERY ELECTRODE AND METHOD OF FORMING SAME

(75) Inventors: Xinran Xiao, Okemos, MI (US); Adam T. Timmons, Southfield, MI (US); Stephen J. Harris, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 13/114,458

(22) Filed: May 24, 2011

(65) Prior Publication Data

US 2012/0301790 A1    Nov. 29, 2012

(51) Int. Cl.
| | |
|---|---|
| H01M 4/13 | (2010.01) |
| H01M 4/58 | (2010.01) |
| H01M 4/62 | (2006.01) |
| H01M 4/74 | (2006.01) |
| H01M 4/66 | (2006.01) |
| H01M 4/68 | (2006.01) |
| B05D 5/12 | (2006.01) |
| H01M 4/82 | (2006.01) |
| H01M 6/00 | (2006.01) |
| H01M 4/139 | (2010.01) |
| H01M 10/0525 | (2010.01) |
| H01M 4/04 | (2006.01) |

(52) U.S. Cl.
CPC ............... *H01M 4/13* (2013.01); *Y02E 60/122* (2013.01); *H01M 4/625* (2013.01); *H01M 4/139* (2013.01); *H01M 10/0525* (2013.01); *H01M 4/0404* (2013.01); *H01M 2220/20* (2013.01); *Y02T 10/7011* (2013.01); *Y10S 977/742* (2013.01); *Y10S 977/762* (2013.01); *Y10S 977/948* (2013.01)
USPC ........ 429/231.8; 429/232; 429/241; 429/245; 427/77; 977/742; 977/762; 977/948; 29/623.5

(58) Field of Classification Search
USPC ................ 29/623.1–623.5; 429/231.4, 231.7, 429/231.8, 232, 215, 241, 245, 221; 427/77; 977/762, 948
See application file for complete search history.

(56) References Cited

U.S. PATENT DOCUMENTS

| | | |
|---|---|---|
| 6,835,226 B2 | 12/2004 | Nishino et al. |
| 7,261,976 B2 | 8/2007 | Mizutani et al. |

(Continued)

FOREIGN PATENT DOCUMENTS

| | | | |
|---|---|---|---|
| WO | WO2006/019148 | * | 2/2006 |
| WO | WO2006/019148 A1 | * | 2/2006 |

*Primary Examiner* — Patrick Ryan
*Assistant Examiner* — Kiran Quraishi
(74) *Attorney, Agent, or Firm* — Quinn Law Group, PLLC (57) ABSTRACT

A method of forming an electrode of a lithium ion secondary battery includes combining a binder and active particles to form a mixture, coating a surface with the mixture to form a coated article, translating the article along a first plane, cutting a first plurality of carbon fibers, each having a first average length, to form a second plurality of carbon fibers, each having a longitudinal axis and a second average length that is shorter than the first average length, inserting the second plurality of fibers into the mixture layer so that the longitudinal axis of each of at least a portion of the second plurality of fibers is not parallel to the first plane to form a preform, wherein the second plurality of fibers forms a truss structure disposed in three dimensions within the mixture layer, and heating the preform to form the electrode. An electrode is also disclosed.

7 Claims, 3 Drawing Sheets

(56) References Cited

U.S. PATENT DOCUMENTS

| | | |
|---|---|---|
| 7,655,354 B2 | 2/2010 | Kawase et al. |
| 2006/0141361 A1* | 6/2006 | Yuasa et al. .................. 429/232 |
| 2008/0261116 A1 | 10/2008 | Burton et al. |
| 2009/0169996 A1* | 7/2009 | Zhamu et al. ................. 429/221 |
| 2009/0197179 A1 | 8/2009 | Wakita et al. |

* cited by examiner

_Fig-3_

_Fig-4_

LITHIUM ION SECONDARY BATTERY ELECTRODE AND METHOD OF FORMING SAME

TECHNICAL FIELD

The present disclosure generally relates to an electrode of a lithium ion secondary battery and a method of forming the electrode.

BACKGROUND

Batteries are useful for converting chemical energy into electrical energy, and may be described as primary or secondary. Primary batteries are generally non-rechargeable, whereas secondary batteries are readily rechargeable and may be restored to a full charge after use. As such, secondary batteries may be useful for applications such as powering electronic devices, tools, machinery, and vehicles. For example, secondary batteries for vehicle applications may be recharged external to the vehicle via a plug-in electrical outlet, or onboard the vehicle via a regenerative event.

One type of secondary battery, a lithium ion secondary battery, may include a negative electrode or anode, a positive electrode or cathode, and an electrolyte disposed between the positive and negative electrodes. The negative electrode may be formed from a material that is capable of incorporating and releasing lithium ions during charging and discharging of the lithium ion secondary battery. More specifically, during charging of the battery, lithium ions may move from the positive electrode to the negative electrode and embed in the material. Conversely, during battery discharge, lithium ions may be released from the material and move from the negative electrode to the positive electrode. As lithium ions incorporate into and release from the material of the negative electrode, the volume of the material may change.

SUMMARY

A method of forming an electrode of a lithium ion secondary battery includes combining a binder and a plurality of active particles to form a mixture, and coating a surface of a substrate with the mixture to form a coated article. The coated article includes the substrate and a mixture layer formed from the mixture and disposed on the surface. The method also includes translating the coated article along a first plane, and cutting a first plurality of carbon fibers to form a second plurality of carbon fibers. Each of the first plurality of carbon fibers has a first average length, and each of the second plurality of carbon fibers has a longitudinal axis and a second average length that is shorter than the first average length. In addition, the method includes inserting the second plurality of carbon fibers into the mixture layer so that the longitudinal axis of each of at least a portion of the second plurality of carbon fibers is not parallel to the first plane so as to form a preform, wherein the second plurality of carbon fibers forms a truss structure disposed in three dimensions within the mixture layer. The method further includes heating the preform to form a cured mixture layer disposed on the surface and thereby form the electrode of the lithium ion secondary battery.

In one embodiment, the method includes combining a binder and a plurality of active particles to form a mixture, and coating a surface of a substrate with the mixture to form a coated article. The coated article includes the substrate and a mixture layer formed from the mixture and disposed on the surface. The method also includes translating the coated article along a first conveyor disposed parallel to a first plane, and translating a carbon fiber fabric formed from a first plurality of carbon fibers along a second conveyor to a rotatable chopping drum, wherein the second conveyor is disposed parallel to a second plane that is spaced apart from and substantially parallel to the first plane. The method further includes cutting the carbon fiber fabric with the rotatable chopping drum to form a second plurality of carbon fibers, wherein each of the first plurality of carbon fibers has a first average length, and each of the second plurality of carbon fibers has a longitudinal axis and a second average length that is shorter than the first average length. Further, the method includes inserting the second plurality of carbon fibers into the mixture layer so that the longitudinal axis of each of at least a portion of the second plurality of carbon fibers is not parallel to the first plane so as to form a preform, wherein the second plurality of carbon fibers forms a truss structure disposed in three dimensions within the mixture layer. In addition, the method includes, concurrent to inserting, disposing the second plurality of carbon fibers in a random orientation in three dimensions within the mixture layer so that the respective longitudinal axes of adjacent carbon fibers of the second plurality of carbon fibers intersect to form the truss structure. Concurrent to inserting and disposing, the method also includes packing the second plurality of carbon fibers into the mixture layer at a volumetric packing fraction of less than or equal to about 40 parts by volume of the second plurality of carbon fibers based on 100 parts by volume of the mixture layer. The method also includes heating the preform, and, concurrent to heating, interspersing the second plurality of carbon fibers and the plurality of active particles within the mixture layer so that the plurality of active particles contacts the second plurality of carbon fibers within the mixture layer to thereby form the electrode of the lithium ion secondary battery.

An electrode of a lithium ion secondary battery includes a substrate having a surface, and a cured mixture layer disposed on the surface. The cured mixture layer is configured for incorporating a plurality of lithium ions during charging of the lithium ion secondary battery to a lithiated state, and releasing the plurality of lithium ions during the discharging of the lithium ion secondary battery to a non-lithiated state. The cured mixture layer includes a binder and a plurality of carbon fibers coated by the binder. Each of the plurality of carbon fibers has a longitudinal axis and an average length. Further, the longitudinal axis of each of at least a portion of the plurality of carbon fibers is not parallel to the surface so that the plurality of carbon fibers forms a truss structure disposed in three dimensions within the cured mixture layer. The cured mixture layer further includes a plurality of active particles substantially uniformly distributed within the truss structure. Each of the plurality of active particles is expandable between a first volume upon release of the plurality of lithium ions during discharging of the lithium ion secondary battery to the non-lithiated state, and a second volume upon incorporation of the plurality of lithium ions during charging of the lithium ion secondary battery to the lithiated state.

The above features and other features and advantages of the present disclosure are readily apparent from the following detailed description of the best modes for carrying out the disclosure when taken in connection with the accompanying drawings.

DETAILED DESCRIPTION

Figure 1:
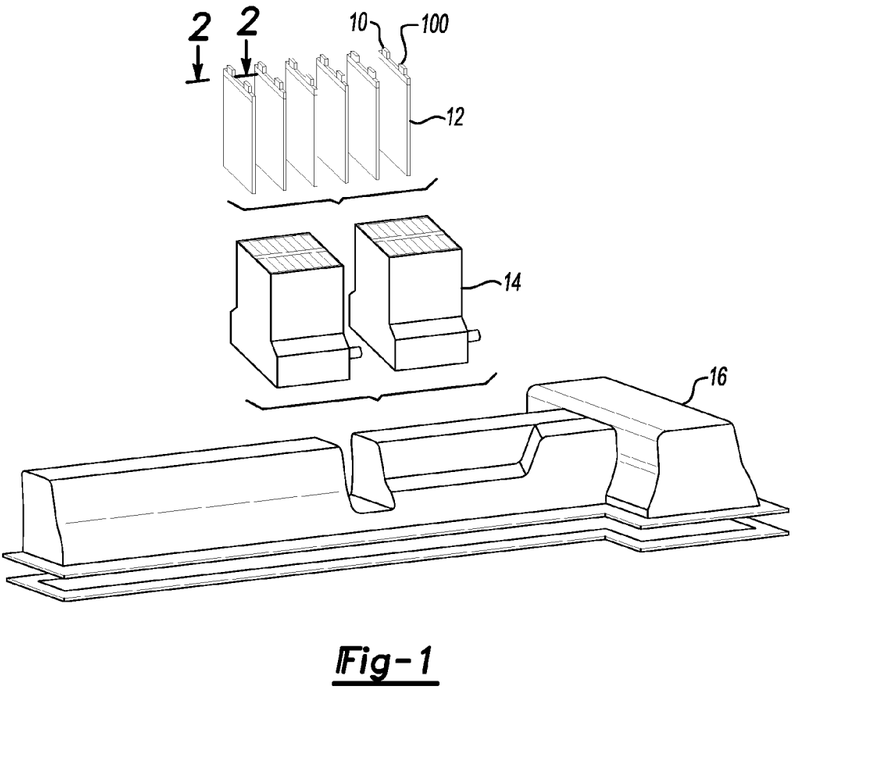
FIG. 1 is a schematic perspective illustration of an electrode of a lithium ion secondary battery.

Referring to the Figures, wherein like reference numerals refer to like elements, an electrode 10 of a lithium ion secondary battery 12 is shown generally in FIG. 1. The electrode 10 may be useful for applications requiring lithium ion secondary batteries 12 having excellent electrical conductivity, mechanical integrity, specific energy capacity, performance, and operating life. Therefore, the electrode 10 may be useful for a variety of applications requiring lithium ion secondary batteries 12, such as, but not limited to, electronic devices, tools, machinery, and vehicles. For example, the electrode 10 may be useful for lithium ion secondary batteries 12 for electric and hybrid electric vehicles. However, it is to be appreciated that the electrode 10 may also be useful for non-automotive applications, such as, but not limited to, household and industrial power tools and electronic devices.

Referring to FIG. 1, for purposes of general explanation, a lithium secondary battery module for an automotive application is shown generally at 14. The lithium ion secondary battery module 14 may be useful for automotive applications, such as for a plug-in hybrid electric vehicle (PHEV). Further, a plurality of battery modules 14 may be combined to form a lithium ion secondary battery pack 16, as shown in FIG. 1. By way of example, the lithium ion secondary battery module 14 may be sufficiently sized to provide a necessary voltage for powering a hybrid electric vehicle (HEV), an electric vehicle (EV), a plug-in hybrid electric vehicle (PHEV), and the like, e.g., approximately 300 to 400 volts or more, depending on the required application.

Referring again to FIG. 1, the lithium ion secondary battery module 14 includes a plurality of lithium ion secondary batteries 12 positioned adjacent to and spaced from one another. Further, each lithium ion secondary battery 12 may have a plurality of electrodes 10, 100, e.g., a positive electrode 100 or cathode and a negative electrode 10 or anode. The electrode 10, 100 described herein may be the positive electrode 100 or the negative electrode 10 of the lithium ion secondary battery 12, depending upon the required configuration and application of the lithium ion secondary battery 12. However, for ease and economy of description, the negative electrode 10 of the lithium ion secondary battery 12 is described below.

The lithium ion secondary battery 12 may be suitable for stacking. That is, the lithium ion secondary battery 12 may be formed from a heat-sealable, flexible foil that is sealed to enclose at least a portion of the electrodes 10, 100 and a separator (not shown). Therefore, any number of lithium ion secondary batteries 12 may be stacked or otherwise placed adjacent to each other to form a cell stack, i.e., the lithium ion secondary battery module 14. Further, although not shown in FIG. 1, additional layers, such as, but not limited to, frames and/or cooling layers may also be positioned in the space between individual lithium ion secondary batteries 12. The actual number of lithium ion secondary batteries 12 may be expected to vary with the required voltage output of each lithium secondary battery module 14. Likewise, the number of interconnected secondary battery modules 14 may vary to produce the necessary total output voltage for a specific application.

During operation, a chemical redox reaction may transfer electrons between a region of relatively negative potential to a region of relatively positive potential to thereby cycle, i.e., charge and discharge, the lithium ion secondary battery 12 and the lithium ion secondary battery pack 16 to provide voltage to power applications. In particular, a plurality of lithium ions (represented generally by symbol 18 in FIG. 4) may transfer between the positive electrode 100 and negative electrode 10 during charging and discharging of the lithium ion secondary battery 12, as set forth in more detail below.

Figure 2:
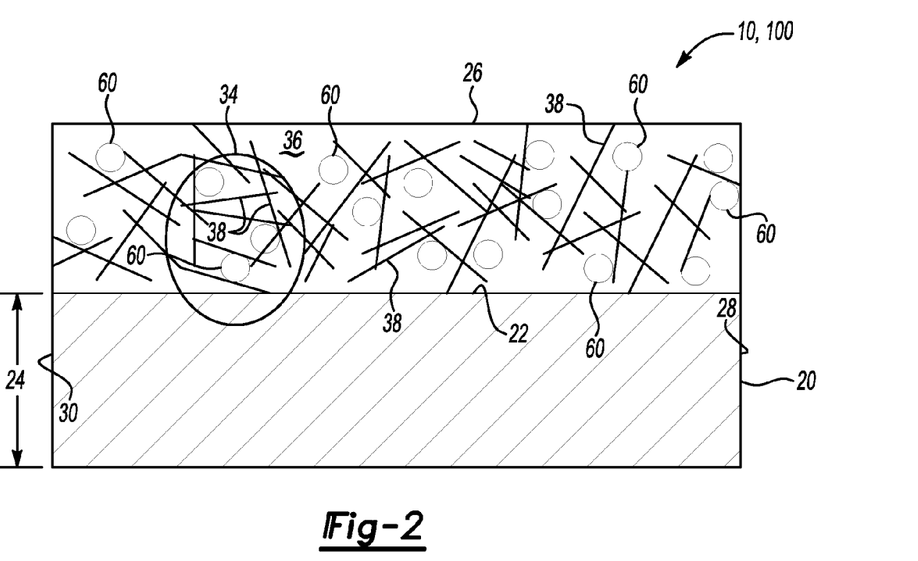
FIG. 2 is a schematic cross-sectional illustration of the electrode of FIG. 1 taken along section line 2-2.

Referring now to FIG. 2, the electrode 10 of the lithium ion secondary battery 12 (FIG. 1) includes a substrate 20 having a surface 22. The substrate 20 may be selected according to a desired application of the lithium ion secondary battery 12. As non-limiting examples, the substrate 20 may be formed from aluminum or copper, may be configured as a backing film or foil, and/or may have a thickness 24 of from about 5 microns to about 25 microns, wherein 1 micron is equal to $1 \times 10^{-6}$ meter. For example, for a negative electrode 10, the substrate 20 may be a copper film having a thickness 24 of about 10 microns. For a positive electrode 100, the substrate 20 may be an aluminum film having a thickness 24 of about 20 microns. Moreover, the surface 22 of the substrate 20 may be configured for receiving and supporting a material during, for example, a coating operation, as set forth in more detail below. Therefore, the surface 22 may be non-porous.

With continued reference to FIG. 2, the electrode 10 also includes a cured mixture layer 26 disposed on the surface 22. That is, the cured mixture layer 26 may coat the surface 22, as set forth in more detail below. In addition, although not shown, the cured mixture layer 26 may also be disposed on or coat additional surfaces 28, 30 that are each adjacent, adjoining, or spaced apart from the surface 22 of the substrate 20.

Figure 3:
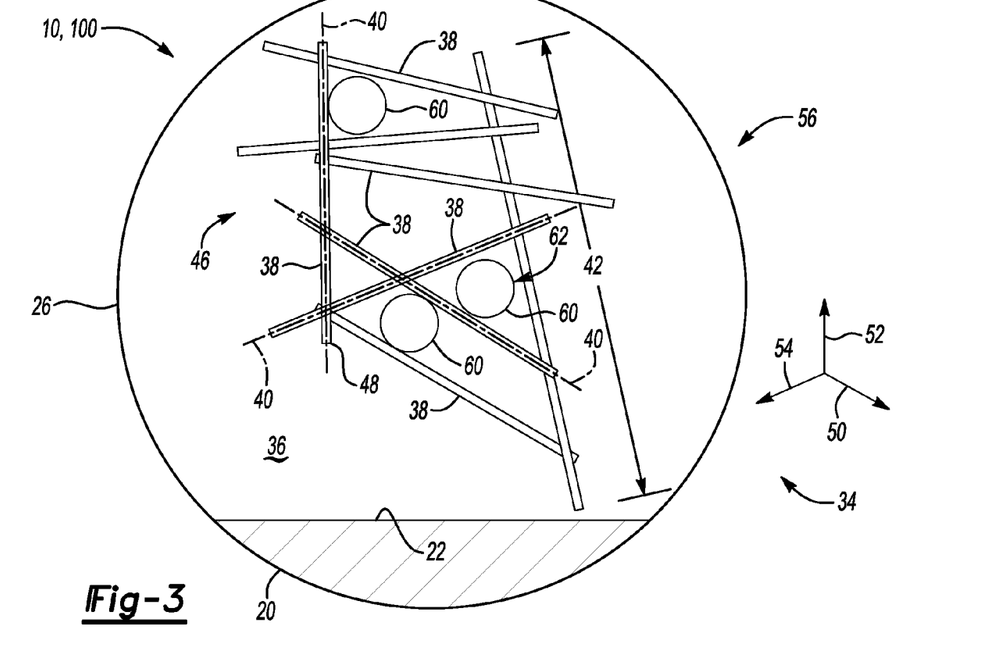
FIG. 3 is a schematic perspective illustration of a magnified portion of the electrode of FIGS. 1 and 2 in a non-lithiated state.
Figure 4:
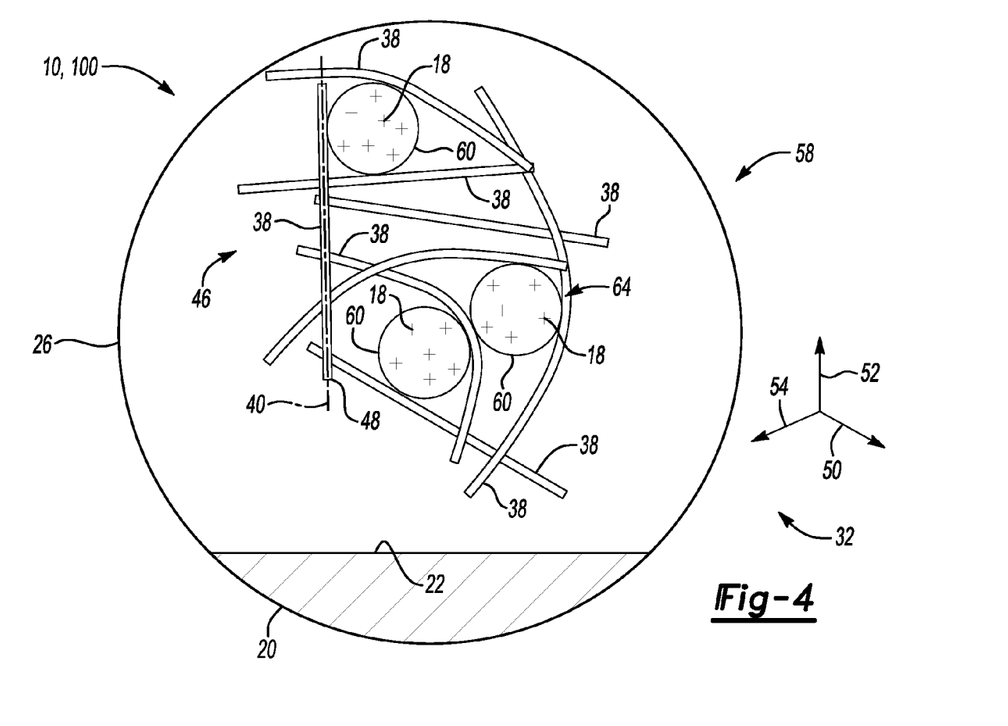
FIG. 4 is a schematic perspective illustration of the magnified portion of the electrode of FIG. 3 in a lithiated state.

Referring to FIGS. 2-4, the cured mixture layer 26 is configured for incorporating the plurality of lithium ions 18 (FIG. 4) during charging of the lithium ion secondary battery 12 (FIG. 1) to a lithiated state (shown generally at 32 in FIG. 4), and releasing the plurality of lithium ions 18 during discharging of the lithium ion secondary battery 12 to a non-lithiated state (shown generally at 34 in FIG. 3). That is, the cured mixture layer 26 is capable of accepting the plurality of lithium ions 18 during charging, and releasing the plurality of lithium ions 18 during discharging of the lithium ion secondary battery 12, as set forth in more detail below. Stated differently, the cured mixture layer 26 may be capable of lithiation and de-lithiation. As used herein, the terminology "lithiation" refers to the transfer and incorporation of the plurality of lithium ions 18 to the negative electrode 10 during charging of the lithium ion secondary battery 12. Conversely, as used herein, the terminology "de-lithiation" refers to the extraction or release of the plurality of lithium ions 18 from the negative electrode 10, and transfer of the plurality of lithium ions 18 to the positive electrode 100 during discharging of the lithium ion secondary battery 12.

With continued reference to FIG. 2, the cured mixture layer 26 includes a binder 36. Non-limiting examples of the binder 36 include polyvinylidene fluoride (PVDF), styrene butadiene rubber, carboxymethylcellulose, and combinations thereof. Further, the binder 36 may be temperature-curable, e.g., hardenable, upon exposure to an increased ambient temperature, as set forth in more detail below. The binder 36 may be present in the cured mixture layer 26 in an amount of from about 1 part by volume to about 5 parts by volume based on 100 parts by volume of the cured mixture layer 26. At amounts greater than about 5 parts by volume of the binder 36, the electrode 10 may not exhibit sufficient electrical conductivity for operation of the lithium ion secondary battery 12.

As best shown in FIG. 2, the cured mixture layer 26 also includes a plurality of carbon fibers 38 coated with the binder 36. That is, the plurality of carbon fibers 38 may be surrounded and encapsulated by the binder 36. As best shown in FIG. 3, each of the plurality of carbon fibers 38 has a longitudinal axis 40 and an average length 42. Further, as described with reference to FIG. 6, each of the plurality of carbon fibers 38 may have an average aspect ratio of from about 50:1 to about 2,000:1. As used herein, the terminology "aspect ratio" refers to a ratio of a longest dimension to a shortest dimension of each carbon fiber 38, e.g., a ratio of an average length 42 to an average width 44 (FIG. 6) of the carbon fiber 38. The aforementioned average aspect ratio may be selected to impart flexibility to the plurality of carbon fibers 38 as arranged within the cured mixture layer 26 during lithiation of the lithium ion secondary battery 12.

The plurality of carbon fibers 38 may be present in the cured mixture layer 26 in an amount of from about 20 parts by volume to about 30 parts by volume based on 100 parts by volume of the cured mixture layer 26. For example, the plurality of carbon fibers 38 may be present in the cured mixture layer 26 in an amount of about 25 parts by volume. At amounts of less than about 20 parts by volume of the plurality of carbon fibers 38, the electrode 10 may not exhibit sufficient electrical conductivity for use in the lithium ion secondary battery 12 (FIG. 1). Likewise, at amounts of greater than about 30 parts by volume, the cured mixture layer 26 may not exhibit sufficient flexibility to accommodate charging and discharging of the lithium ion secondary battery 12.

As shown in FIGS. 3 and 4, the plurality of carbon fibers 38 is arranged in a truss structure (shown generally at 46 in FIGS. 3 and 4) within the cured mixture layer 26. In particular, the longitudinal axis 40 of each of at least a portion of the plurality of carbon fibers 38 is not parallel to the surface 22 so that the truss structure 46 is disposed in three dimensions, e.g., an x-, y-, and z-dimension represented generally by 50, 52, and 54 in FIGS. 3 and 4, within the cured mixture layer 26. That is, the longitudinal axis 40 of each of at least a portion of the plurality of carbon fibers 38 may be, for example, perpendicular or angled with respect to the surface 22 so that the respective longitudinal axes 40 may intersect the surface 22 if extended beyond an end 48 of each carbon fiber 38. Stated differently, at least a portion of each of the plurality of carbon fibers 38 does not "lie flat" with respect to the surface 22 of the substrate 20 within the cured mixture layer 26. Rather, the plurality of carbon fibers 38 may be disposed in a random orientation in three dimensions 50, 52, 54 within the cured mixture layer 26 so that the respective longitudinal axes 40 of adjacent carbon fibers 38 of the plurality of carbon fibers 38 intersect to form the truss structure 46. That is, the plurality of carbon fibers 38 may be randomly arranged so that the truss structure 46 may have a web-like configuration within the cured mixture layer 26.

Further, as described with continued reference to FIGS. 3 and 4, at least one of the plurality of carbon fibers 38 is connected to at least an adjacent one of the plurality of carbon fibers 38 within the cured mixture layer 26. For example, the binder 36 may connect individual carbon fibers 38 to one another to form the web-like truss structure 46 within the cured mixture layer 26.

In addition, as shown generally in FIGS. 3 and 4, the plurality of carbon fibers 38 may be packed within the cured mixture layer 26 at a volumetric packing fraction of less than or equal to about 40 parts by volume of the plurality of carbon fibers 38 based on 100 parts by volume of the cured mixture layer 26. As used herein, the terminology "volumetric packing fraction" refers to a fraction of volume occupied by the plurality of carbon fibers 38 in the cured mixture layer 26. Therefore, the cured mixture layer 26 may be generally porous. In addition, the truss structure 46 may be flexible and reboundable between a first shape 56 (FIG. 3) corresponding to the non-lithiated state 34 of the lithium ion secondary battery 12 and a second shape 58 (FIG. 4) corresponding to the lithiated state 32 of the lithium ion secondary battery 12, as set forth in more detail below. That is, the truss structure 46 may be defined by adjoining carbon fibers 38 of the second plurality of carbon fibers 38 and may be flexible and reboundable between the first shape 56 corresponding to the non-lithiated state 34 of the lithium ion secondary battery 12 during discharging of the lithium ion secondary battery 12, and the second shape 58 corresponding to the lithiated state 32 of the lithium ion secondary battery 12 during charging of the lithium ion secondary battery 12. Therefore, the truss structure 46 may flex between the first shape 56 and second shape 58 during charging and discharging of the lithium ion secondary battery 12.

Referring again to FIGS. 2-4, the cured mixture layer 26 further includes a plurality of active particles 60 substantially uniformly distributed within the truss structure 46 (FIGS. 3 and 4). That is, the plurality of active particles 60 may be substantially uniformly distributed within the cured mixture layer 26 so that each portion of the cured mixture layer 26 includes the plurality of active particles 60. For example, as best shown in FIGS. 3 and 4, the plurality of carbon fibers 38 and the plurality of active particles 60 may be interspersed within the cured mixture layer 26 so that the plurality of active particles 60 contacts the plurality of carbon fibers 38 within the cured mixture layer 26. That is, the plurality of active particles 60 may be dispersed throughout the cured mixture layer 26 so that at least a portion of the plurality of active particles 60 abuts one or more adjacent carbon fibers 38.

In addition, each of the plurality of active particles 60 is expandable between a first volume (shown generally at 62 in FIG. 3) upon release of the plurality of lithium ions 18 (FIG. 4) during discharging of the lithium ion secondary battery 12 to the non-lithiated state 34, and a second volume (shown generally at 64 in FIG. 4) upon incorporation of the plurality of lithium ions 18 during charging of the lithium ion secondary battery 12 to the lithiated state 32. That is, the plurality of active particles 60 may change volume and expand during lithiation.

However, as described with reference to FIGS. 3 and 4, each of the plurality of active particles 60 may be constrained by the truss structure 46 during expansion from the first volume 62 to the second volume 64. That is, during lithiation of the lithium ion secondary battery 12, the plurality of active particles 60 may accept and incorporate the plurality of lithium ions 18 (FIG. 4) and thereby expand to the second volume 64. Conversely, during de-lithiation of the lithium ion secondary battery 12, the plurality of active particles 60 may release the previously-incorporated plurality of lithium ions 18 and thereby shrink from the second volume 64 to the first volume 62. During such expansion from the first volume 62 to the second volume 64, the truss structure 46 may flex or bend in response to the expansion. That is, the plurality of carbon fibers 38 may constrain the plurality of active particles 60 in a flexible, 3-dimensional web that is configured to rebound between the first shape 56 (corresponding to the non-lithiated state 34 of the lithium ion secondary battery 12) and the second shape 58 (corresponding to the lithiated state 32 of the lithium ion secondary battery 12). Therefore, the truss structure 46 may be both flexible and electrically-conductive.

The plurality of active particles 60 may include materials capable of alloying with lithium. More specifically, non-limiting examples of the plurality of active particles may include alloys of tin (Sn), silicon (Si), germanium (Ge), carbon (C), zinc (Zn), cadmium (Cd), lead (Pb), bismuth (Bi), indium (In), and antimony (Sb). For example, the plurality of active particles 60 may be formed by milling a Si—Sn alloy. The plurality of active particles 60 may be present in the cured mixture layer 26 in an amount of from about 15 parts by volume to about 25 parts by volume based on 100 parts by volume of the cured mixture layer 26. At amounts of less than about 15 parts by volume of the plurality of active particles 60, the electrode 10 may not exhibit sufficient electrical conductivity for operation of the lithium ion secondary battery 12. Likewise, at amounts of greater than about 25 parts by volume of the plurality of active particles 60, the cured mixture layer 26 may not exhibit sufficient flexibility for lithiation and de-lithiation of the lithium ion secondary battery 12.

Figure 5:
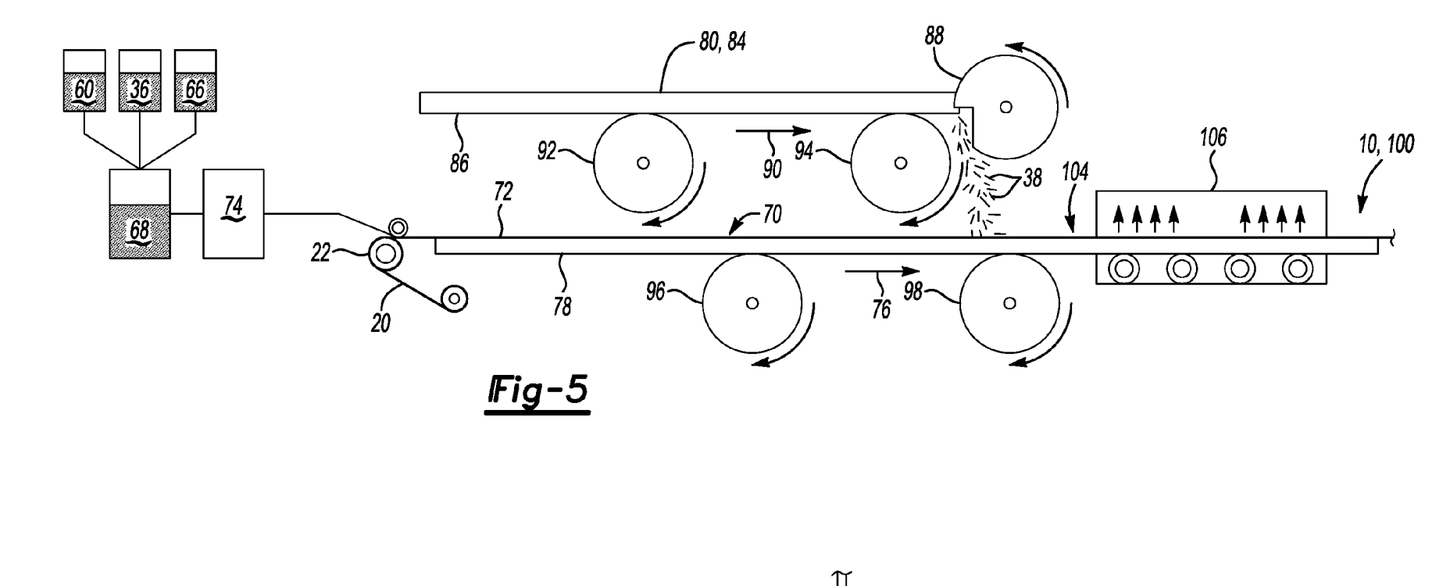
FIG. 5 is a schematic illustration of a method of forming the electrode of FIGS. 1-4.

Although not shown, the cured mixture layer 26 may also include other constituents or additives (represented generally by 66 in FIG. 5). For example, the cured mixture layer 26 may include other additives 66 such as, but not limited to, polymers, conductive additives, fillers, and combinations thereof. Suitable examples of polymers may include, but are not limited to, non-fluorinated polymers such as ethylene propylene diene monomers (EPDM) and polystyrene. Suitable examples of conductive additives may include, but are not limited to, carbon or graphite additives such as single-walled carbon nanotubes, multi-walled carbon nanotubes, pyrolitic carbon, exfoliated graphite flakes, graphite platelets, vapor grown carbon fibers, carbides, grapheme particles, carbon black, mesocarbon microbeads, and combinations thereof. Suitable examples of fillers may include, but are not limited to, vitreous materials such as glass beads and ceramic particles.

The electrode 10 may have a specific energy capacity of from about 1,400 mAh/g to about 1,800 mAh/g. Therefore, the electrode 10 of the lithium ion secondary battery 12 exhibits excellent electrical conductivity, mechanical integrity, specific energy capacity, performance, and operating life. In particular, the truss structure 46 formed from the interconnected plurality of carbon fibers 38 is sufficiently flexible to withstand volumetric changes of the plurality of active particles 60 during charging and discharging of the lithium ion secondary battery 12. That is, the plurality of active particles 60 can expand freely within the truss structure 46 from the first volume 62 to the second volume 64 during lithiation of the lithium ion secondary battery 12.

Figure 6:
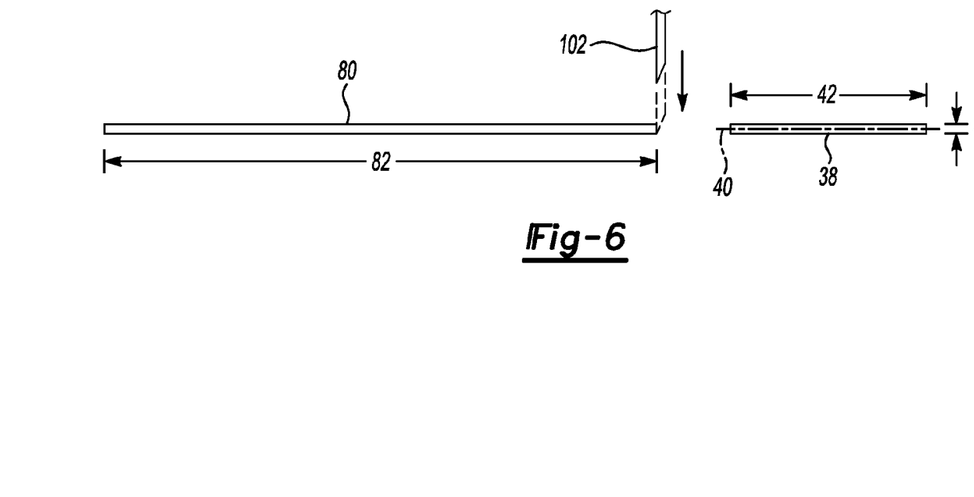
FIG. 6 is a schematic illustration of a method of cutting a first plurality of carbon fibers for forming the electrodes of FIGS. 1-4.

A method of forming the electrode 10 of the lithium ion secondary battery 12 is also described with reference to the Figures. Referring specifically to FIGS. 5 and 6, the method includes combining the binder 36 and the plurality of active particles 60 to form a mixture 68. For variations of the electrode 10 including the additives 66 as set forth above, the method may optionally include combining the one or more additives 66 with the binder 36 and the plurality of active particles 60 to form the mixture 68. The binder 36, plurality of active particles 60, and optional additives 66 may be combined in any order and in any manner. For example, the plurality of active particles 60 may be added to the binder 36 or the binder may be added to the plurality of active particles 60. In addition, the binder 36 and plurality of active particles 60 may be combined under agitation and/or may be agitated after combination.

With continued reference to FIG. 5, the method further includes coating the surface 22 (FIG. 2) of the substrate 20 with the mixture 68 to form a coated article 70. Therefore, the coated article 70 includes the substrate 20 and the mixture layer 72 formed from the mixture 68 and disposed on the surface 22. The surface 22 may be coated in any suitable manner. For example, the mixture 68 may be transferred to the surface 22 under pressure supplied by a pump 74, and the surface 22 may be roll-coated with the mixture 68 to thereby form the coated article 70. It is to be appreciated that the surface 22 is coated with the mixture 68 in an uncured state. As such, the coated article 70 includes the mixture layer 72 in an uncured state.

In addition, as shown in FIG. 5, the method also includes translating the coated article 70 along a first plane (represented generally by arrow 76). The coated article 70 may be translated along the first plane 76 via any suitable movable apparatus. For example, the method may include translating the coated article 70 along a first conveyor 78 disposed parallel to the first plane 76.

Referring now to FIGS. 5 and 6, the method further includes cutting a first plurality of carbon fibers 80 to form a second plurality of carbon fibers 38, i.e., the plurality of carbon fibers 38 referenced above. That is, as shown in FIG. 6, each of the first plurality of carbon fibers 80 has a first average length 82, and each of the second plurality of carbon fibers 38 has a longitudinal axis 40 and a second average length 42, i.e., the average length 42 referenced above, that is shorter than the first average length 82. Stated differently, cutting the first plurality of carbon fibers 80 provides a second plurality of carbon fibers 38, wherein each of the second plurality of carbon fibers 38 is shorter on average than each of the first plurality of carbon fibers 80.

The first plurality of carbon fibers 80 may be cut in any manner. For example, as shown in FIG. 5, the method may include translating a carbon fiber fabric 84 (FIG. 5) formed from the first plurality of carbon fibers 80 along a second conveyor 86 to a rotatable chopping drum 88. In this variation, as shown in FIG. 5, the second conveyor 86 is disposed parallel to a second plane (represented generally by arrow 90) that is spaced apart from and substantially parallel to the first plane 76. For example, the second conveyor 86 may be disposed superior to the first conveyor 78. Therefore, each of the first and second conveyors 78, 86 may translate the coated article 70 and the carbon fiber fabric 84, respectively, along the first and second planes 76, 90, respectively. The first and second conveyors 78, 86 may translate at the same or different speeds, in the same or different directions, along a plurality of driving- or driven-axles 92, 94, 96, 98.

Therefore, as shown in FIGS. 5 and 6, the method may include cutting the carbon fiber fabric 84 with the rotatable chopping drum 88 to form the plurality of carbon fibers 38. For example, the carbon fiber fabric 84 may be tumbled within the rotatable chopping drum 88, which may be equipped with a cutting blade 102 (FIG. 6) and/or internal serrations (not shown) that are configured to cut the first plurality of carbon fibers 80 to form the second plurality of carbon fibers 38.

Referring again to FIG. 5, the method also includes inserting the second plurality of carbon fibers 38 into the mixture layer 72 so that the longitudinal axis 40 (FIG. 6) of each of at least a portion of the second plurality of carbon fibers 38 is not parallel to the first plane 76 so as to form a preform 104, wherein the second plurality of carbon fibers 38 forms the truss structure 46 (FIGS. 3 and 4) disposed in three dimensions (denoted generally at 50, 52, 54 in FIGS. 3 and 4) within the mixture layer 72. That is, the second plurality of carbon fibers 38 may be shot or dropped into the mixture layer 72 of the coated article 70 while the coated article 70 translates along the first plane 76 so that the second plurality of carbon fibers 38 forms the truss structure 46, as described above. That is, the second plurality of carbon fibers 38 may not "lie flat" but instead may be disposed within the mixture layer 72 in a three-dimensional web to form the preform 104. The preform 104 generally includes each constituent or component of the eventual electrode 10, but the preform 104 is distinguished from the electrode 10 in that the preform 104 exists in an uncured state. That is, the second plurality of carbon fibers 38 is inserted into the uncured mixture layer 26 (FIGS. 2-4).

Therefore, as described with reference to FIGS. 4 and 5, in one embodiment, the method may further include disposing the second plurality of carbon fibers 38 in a random orientation in three dimensions 50, 52, 54 within the mixture layer 72 (FIG. 5) so that the respective longitudinal axes 40 of adjacent carbon fibers 38 of the second plurality of carbon fibers 38 intersect to form the truss structure 46. The method may also include connecting at least one of the second plurality of carbon fibers 38 to at least an adjacent one of the second plurality of carbon fibers 38 within the mixture layer 72.

Further, inserting may substantially uniformly distribute the plurality of active particles 60 within the truss structure 46, as best shown in FIGS. 4 and 5. That is, the method may include interspersing the second plurality of carbon fibers 38 and the plurality of active particles 60 within the mixture layer 72 so that the plurality of active particles 60 contacts the second plurality of carbon fibers 38 within the mixture layer 72. In addition, the method may further include packing the second plurality of carbon fibers 38 into the mixture layer 72 at a volumetric packing fraction of less than or equal to about 40 parts by volume of the second plurality of carbon fibers 38 based on 100 parts by volume of the mixture layer 72.

With continued reference to FIGS. 3-5, the method also includes heating the preform 104 to form the cured mixture layer 26 (FIG. 3) disposed on the surface 22 (FIG. 3) and thereby form the electrode 10 of the lithium ion secondary battery 12 (FIG. 1). The preform 104 may be heated in any manner. For example, the preform 104 may translate along the second conveyor 86 to a curing oven 106, as shown in FIG. 5. In a non-limiting example, heating may cure the mixture layer 72 at a temperature of from about 85° C. to about 100° C. for a duration of from about 5 minutes to about 15 minutes to form the cured mixture layer 26 disposed on the surface 22 and configured for incorporating the plurality of lithium ions 18 (FIG. 4) during charging of the lithium ion secondary battery 12 to the lithiated state 32 (FIG. 4), and releasing the plurality of lithium ions 18 during discharging of the lithium ion secondary battery 12 to the non-lithiated state 34 (FIG. 3).

In one embodiment described with reference to FIGS. 3-5, the method also includes, concurrent to inserting, disposing the second plurality of carbon fibers 38 in a random orientation in three dimensions 50, 52, 54 (FIGS. 3 and 4) within the mixture layer 72 so that the respective longitudinal axes 40 (FIGS. 3 and 4) of adjacent carbon fibers 38 of the second plurality of carbon fibers 38 intersect to form the truss structure 46 (FIGS. 3 and 4). In addition, concurrent to inserting and disposing, the method includes packing the second plurality of carbon fibers 38 into the mixture layer 72 at a volumetric packing fraction of less than or equal to about 40 parts by volume of the second plurality of carbon fibers 38 based on 100 parts by volume of the mixture layer 72. In this embodiment, the method also includes, concurrent to heating, interspersing the second plurality of carbon fibers 38 and the plurality of active particles 60 within the mixture layer 72 so that the plurality of active particles 60 contacts the second plurality of carbon fibers 38 within the mixture layer 72 to thereby form the electrode 10 of the lithium ion secondary battery 12.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming an electrode of a lithium ion secondary battery, the method comprising:
   combining a binder and a plurality of active particles to form a mixture;
   coating a surface of a substrate with the mixture to form a coated article, wherein the coated article includes the substrate and a mixture layer formed from the mixture and disposed on the surface;
   translating the coated article in a first direction along a first conveyor disposed parallel to a first plane;
   translating a first plurality of carbon fibers in the first direction along a second conveyor having an end, wherein the second conveyor is spaced apart from and disposed substantially parallel to the first plane;
   cutting the first plurality of carbon fibers at the end to form a second plurality of carbon fibers, wherein each of the first plurality of carbon fibers has a first average length and each of the second plurality of carbon fibers has a longitudinal axis and a second average length that is shorter than the first average length;
   concurrent to translating the coated article, dropping the second plurality of carbon fibers from the end onto the coated article to thereby insert the second plurality of carbon fibers into the mixture layer so that the longitudinal axis of each of at least a portion of the second plurality of carbon fibers is not parallel to the first plane so as to form a preform, wherein the second plurality of carbon fibers forms a truss structure disposed in three dimensions within the mixture layer; and
   heating the preform to form a cured mixture layer disposed on the surface and thereby form the electrode of the lithium ion secondary battery.

2. The method of claim 1, further including disposing the second plurality of carbon fibers in a random orientation in three dimensions within the mixture layer so that the respective longitudinal axes of adjacent carbon fibers of the second plurality of carbon fibers intersect to form the truss structure.

3. The method of claim 1, wherein the truss structure is defined by adjoining carbon fibers of the second plurality of carbon fibers and is flexible and reboundable between a first shape corresponding to a non-lithiated state of the lithium ion secondary battery during discharging of the lithium ion secondary battery, and a second shape corresponding to a lithiated state of the lithium ion secondary battery during charging of the lithium ion secondary battery.

4. The method of claim 1, further including packing the second plurality of carbon fibers into the mixture layer at a volumetric packing fraction of less than or equal to about 40 parts by volume of the second plurality of carbon fibers based on 100 parts by volume of the mixture layer.

5. The method of claim 2, further including connecting at least one of the second plurality of carbon fibers to at least an adjacent one of the second plurality of carbon fibers within the mixture layer.

6. The method of claim 2, further including interspersing the second plurality of carbon fibers and the plurality of active particles within the mixture layer so that the plurality of active particles contacts the second plurality of carbon fibers within the mixture layer.

7. The method of claim 6, wherein dropping uniformly distributes the plurality of active particles within the truss structure so that each portion of the mixture layer includes the plurality of active particles and the plurality of active particles are interspersed within the mixture layer.

* * * * *